US008637429B2

(12) United States Patent
Walker et al.

(10) Patent No.: US 8,637,429 B2
(45) Date of Patent: Jan. 28, 2014

(54) SUBSTRATE MARKING

(75) Inventors: Martin Walker, Cheshire (GB); Anthony Jarvis, Cheshire (GB); Christopher Wyres, Cheshire (GB); William Green, Cheshire (GB)

(73) Assignee: Datalase Ltd, Cheshire (GB)

( * ) Notice: Subject to any disclaimer, the term of this patent is extended or adjusted under 35 U.S.C. 154(b) by 245 days.

(21) Appl. No.: 13/060,982

(22) PCT Filed: Aug. 26, 2009

(86) PCT No.: PCT/GB2009/051062
§ 371 (c)(1),
(2), (4) Date: Mar. 23, 2011

(87) PCT Pub. No.: WO2010/026407
PCT Pub. Date: Mar. 11, 2010

(65) Prior Publication Data

US 2011/0183126 A1 Jul. 28, 2011

(30) Foreign Application Priority Data

Sep. 3, 2008 (GB) .................................. 0815999.8
Apr. 2, 2009 (GB) .................................. 0905785.2

(51) Int. Cl.
*B41M 1/26* (2006.01)
*B41M 1/28* (2006.01)
*B41M 1/30* (2006.01)
*B41M 1/34* (2006.01)
*G11B 7/00* (2006.01)

(52) U.S. Cl.
USPC ............................ 503/201; 430/200; 430/945

(58) Field of Classification Search
USPC .................................................. 503/200–226
See application file for complete search history.

(56) References Cited

U.S. PATENT DOCUMENTS

| | | | |
|---|---|---|---|
| 5,063,137 A | 11/1991 | Kiyonari et al. |
| 5,840,791 A | 11/1998 | Magerstedt et al. |
| 5,897,938 A | 4/1999 | Shinmoto et al. |
| 2005/0269304 A1 | 12/2005 | Khan et al. |

FOREIGN PATENT DOCUMENTS

| | | |
|---|---|---|
| EP | 0 675 001 | 10/1995 |
| WO | WO 2007/045912 | 4/2007 |
| WO | WO 2007/141522 | 12/2007 |
| WO | WO 2009/010393 | 1/2009 |

*Primary Examiner* — Bruce H Hess

(74) *Attorney, Agent, or Firm* — Saliwanchik, Lloyd & Eisenschenk

(57) ABSTRACT

The invention relates to a method of marking a substrate comprising treating the substrate with a boron compound and a charrable agent, and, irradiating the areas of the substrate to be marked such that those areas change colour. Marked substrates obtainable by this method are also provided.

14 Claims, No Drawings

SUBSTRATE MARKING

CROSS REFERENCE TO A RELATED APPLICATION

This application is a National Stage Application of International Application Number PCT/GB2009/051062, filed Aug. 26, 2009; which claims priority to Great Britain Application No. 0815999.8, filed Sep. 3, 2008 and Great Britain Application No. 0905785.2, filed Apr. 2, 2009; all of which are incorporated herein by reference in their entirety.

FIELD OF THE INVENTION

The invention relates to a method of marking a substrate comprising treating the substrate with a boron compound and a charrable agent, and to substrates marked using this method.

BACKGROUND OF THE INVENTION

Laser coding of materials is well-known—see for example, U.S. Pat. No. 5,783,793, U.S. Pat. No. 4,906,813 and also U.S. Pat. No. 5,340,628 which seeks to contain the particles produced by ablation. These methods present a variety of problems, including difficulties in maintenance, line downtime, taint, as well as the need for extraction.

WO 02/068205 teaches a method for marking an object using a laser. Suitable additives, including for instance a polyhydroxy compound and a dehydrating compound are provided in a coating on a solid substrate, which is then imaged. Exemplary substrates include foodstuffs. The polyhydroxy agent is typically a sugar, and a metal salt may be used to remove OH groups.

WO 2007/045912 describes methods of marking substrates such as paper, card or board. The substrate is coated with a solution of a soluble alkali or alkaline earth metal salt of a weak acid, and areas of the substrate are irradiated such that those areas change colour.

In view of the prior art there remains a desire to provide improved marking methods which can be used on a wide variety of substrates.

SUMMARY OF THE INVENTION

In one aspect the present invention is a method of marking a substrate comprising treating the substrate with a boron compound and a charrable agent; and irradiating the areas of the substrate to be marked such that those areas change colour.

In another aspect of the invention there is provided a marked substrate obtainable by the method of this invention.

The inventors have found that surprisingly a formulation comprising a boron compound and a charrable agent such as a sugar can be coated onto any substrate, and gives rise to black (rather than unfavourable brown) images when imaged using a $CO_2$ laser.

Laser imaging with a boron compound on a non-polysaccharide containing substrate (such as PET) in the past gave negligible contrast imaging. However, adding a charrable polysaccharide to the boron compound results in a black image at relatively low laser powers—for instance around 20% laser power with a 40W $CO_2$ laser. This enables marking at a higher speed and marking on thermally sensitive substrates. It also allows imaging through laminates.

On polysacharride-containing substrates it has also been found that surprising results are obtainable by including a charrable with a boron compound. Again black images at relatively low powers can be produced, as opposed to brown images at high powers. Without an added charrable a 40W $CO_2$ laser required 60% power to generate brown marks. However, including a charrable gave black marks at around 20% power. Less power gave greatly improve scuff resistance.

We have also found that the formulation used in this invention is surprisingly heat resistant.

DETAILED DESCRIPTION OF INVENTION

Preferred boron compounds for use in this invention are borates, and examples of such compounds include but are not limited to monoborates, diborates, triborates, tetraborates, pentaborates octaborates, metaborates and the like. Further examples of borates are given in "Chemistry of the Elements" by Greenwood and Earnshaw, 2$^{nd}$ Edition, Elsevier 1997. Other compounds that form part of the present invention include perborates, boron oxides, and boric acid.

Preferred borate compounds are borate salts. Particularly preferred are borate salts formed with alkali and alkaline earth metal cations including: lithium, sodium, potassium, rubidium, cesium, beryllium, calcium, magnesium, strontium, and barium salts. Ammonium and amine salts also form part of the present invention. Transition metals cations can also form salts with borates that form part of the present invention and include iron, copper, cobalt, nickel and zinc. Other metal salts include aluminium borates. The borate salt can have any number of waters of crystallization.

Also included are borate esters such as triethyl borate and the like.

A particularly preferred boron compound is sodium metaborate.

The charrable agent can be any substance that undergoes a charring reacting on heating to yield a contrasting colour. Suitable examples of charrable agents are compounds that typically contain a high content of carbon and oxygen. Preferably the charrable agent is a carbohydrate. Examples of suitable carbohydrates include saccharides, polysaccharides, sugars, polysugars and sugars wherein the carbonyl group has been reduced to a hydroxyl group, to give a sugar alcohol, starches, celluloses, gums and the like.

Examples include but are not limited to glucose, sucrose, saccharose, fructose, dextrose, lactose, sorbitol, xylitol, pectin, mannitol, manitose, erythritol, galactose, cellobiose, mannose, arabinose, ribose, erythrose, xylose, cyclodextrin, meso-erythritol, pentaerythritol, indulin, dextrin, polydextrose, maltose, maltodextrin of any DE, corn syrups, starch, amylose, amylopectin, pectic acid, cellulose and cellulose derivatives such as such as sodium-CMC, and hydroxypropylcellulose, galactomannans, guar gum, locust bean gum, gum arabic and the like. Other examples of charrable agents include amino acids, amino sugars such as glucosamine, chitin and chitosan, alginates as taught in WO06/129086, gluconates and malonates as taught in WO06/129078, and any of the charrable compounds which undergo an elimination reaction as taught in WO02/068205, such as poly(vinyl alcohol) and poly(vinyl chloride). Further examples of charrable agents are taught in WO08/107345.

The boron compound and the charrable agent of the present invention can be applied to the substrate as part of a coating that is applied to the surface of the substrate. This is done by formulating the boron compound and the charrable agent into a, usually liquid, ink formulation. The ink can be water or solvent based. The ink can be applied to the substrate using any printing process such as flexo, gravure, screen printing, off-set, UV curable and flood coating and the like.

The boron compound and the charrable agent can also be directly embedded into the substrate. This is done by adding the boron compound and charrable agent into the substrate as it in manufactured (for example, into paper at the sizing stage).

The ink formulation or substrate comprising the boron compound and the charrable agent can further comprise other additives. Examples include binders; anti-foam agents; biocides; surfactants; rheology modifiers; colour forming agents which can be inorganic such as molybdates or tungstates (particularly preferred is ammonium octamolybdate), or organic (examples include leuco dyes, diacetylenes and charge transfer agents); acid generating agents such an 'onium' type species; base generating agents; UV absorbers; light stabilizing agents; optical brightening agents; traditional dyes and pigments; whitening agents such as $TiO_2$; near infrared absorbing agents such as copper (II) salts (particularly preferred is copper (II) hydroxyl phosphate), non-stoichiometric compounds (particularly preferred are reduced indium tin oxide and reduced zinc oxide), organic NIR dyes/pigments such as N,N,N',N'-tetrakis(4-dibutylaminophenyl)-p-phenylenediammonium diperfluoroantimonate, conductive polymers such as PEDOT; and Iriodin and Lazerflair type pigments as used in laser welding applications.

The irradiation that causes the substrate to change colour is preferably supplied by a laser. The laser can have a wavelength in the range 120 nm to 20 microns.

Particularly preferred lasers are $CO_2$ lasers operating in the mid-infrared region typically with a wavelength of 10.6 microns. Also preferred are NIR lasers operating with a wavelength in the range 780 to 2500 nm. When a NIR laser is employed it is preferable to include into the substrate an NIR absorbing agent as described above, particularly if its absorptivity profile approximately matches the wavelength of the laser. The laser can be a single steered beam, or an array of laser emitters. A suitable non-coherent irradiation source can also be used. The radiation can be monochromatic or broadband.

The substrate can be any substrate which requires printed information. Examples include but are not limited to: paper, card, corrugate, board, metals, foils, glass, textiles, wood, leather, plastic films such as PET and PP, plastic parts, foodstuffs and pharmaceutical unit dose preparations. The substrate of the present invention can then also be used to form labels, or primary or secondary packaging.

The laser can be used to image on to the substrate human readable text, graphics, logos and devices and machine readable codes such as barcodes and the like.

EXAMPLES

Example 1

An ink formulation was made up as follows:

| | % |
|---|---|
| Water | 35.0 |
| Sucrose | 4.0 |
| Polydextrose | 4.0 |
| Biocide | 0.4 |
| Anionic surfactant | 0.2 |
| Borax | 20.0 |
| Binder | 36.0 |
| Anti-foam | 0.4 |

Example 2

An ink formulation was made up as follows:

| | % |
|---|---|
| Water | 35.0 |
| Maltodextrin | 8 |
| Biocide | 0.4 |
| Non-ionic surfactant | 0.2 |
| Sodium metaborate | 20.0 |
| Binder | 36.0 |
| Anti-foam | 0.4 |

The inks were drawn down on to 50 micron PET film and clear BOPP using an RK-coater and 30 micron K-bar.

A $CO_2$ laser was used to black characters on the substrate including human readable text and machine readable barcodes.

The invention claimed is:

1. A method of marking a substrate comprising treating the substrate with a boron compound and a charrable agent which is a sugar; and irradiating the areas of the substrate to be marked such that those areas change colour wherein the boron compound is an alkali or alkaline earth metal salt of a borate, and wherein the substrate is non-cellulose based.

2. The method according to claim 1, wherein the borate salt is a monoborate, diborate, triborate, tetraborate, pentaborate, octaborate, or metaborate.

3. The method according to claim 1, wherein the irradiation is provided by a laser operating with a wavelength in the region 120 nm to 20 microns.

4. The method according to claim 1, wherein the boron compound and charrable agent are applied to the substrate in a liquid surface coating formulation.

5. The method according to claim 4, wherein the liquid surface coating formulation additionally comprises a binder.

6. The method according to claim 1, wherein the boron compound and charrable agent are embedded directly into the substrate.

7. The method according to claim 1, wherein the substrate is additionally treated with an NIR absorbing agent.

8. The method according to claim 7, wherein the NIR absorbing agent is a copper (II) salt, a non-stoichiometric compound, an organic NIR dye or pigment or a conductive polymer.

9. The method according to claim 1, wherein the substrate is; a polymer film; glass; textile; metal; a plastic part; foodstuff or a pharmaceutical unit dose preparation.

10. The method according to claim 1, wherein the substrate is marked with human readable text or graphics, or a machine readable code.

11. The method according to claim 10, wherein the machine readable code is a barcode.

12. A marked substrate obtainable using the method as described in claim 1.

13. A method of marking a substrate comprising treating the substrate with a boron compound and a charrable agent which is a sugar; and irradiating the areas of the substrate to be marked such that those areas change colour to produce a black mark wherein the boron compound is an alkali or alkaline earth metal salt of a borate, and wherein the substrate is non-cellulose based.

14. The method according to claim 13, wherein the borate salt is a monoborate, diborate, triborate, tetraborate, pentaborate, octaborate, or metaborate.

* * * * *